United States Patent [19]

Kohls et al.

[11] Patent Number: 5,004,799

[45] Date of Patent: Apr. 2, 1991

[54] PELLETIZED SULFUR CONCRETE AND METHOD OF PREPARING SAME

[75] Inventors: Dennis E. Kohls, Salina; Francis M. Moser, Sabetha, both of Kans.

[73] Assignee: Reece Construction Company, Inc., Scandia, Kans.

[21] Appl. No.: 409,677

[22] Filed: Sep. 20, 1989

[51] Int. Cl.$^5$ .................... C08K 3/00; C08L 47/00
[52] U.S. Cl. .................... 528/389; 106/724; 106/736; 524/494; 524/524; 524/609; 528/502
[58] Field of Search ............. 528/389, 502; 524/494, 524/609, 524; 504/148; 106/97, 90

[56] References Cited

U.S. PATENT DOCUMENTS

| | | | |
|---|---|---|---|
| 3,954,480 | 5/1976 | Inderwick | 501/140 |
| 4,188,230 | 2/1980 | Gillot et al. | 501/140 |
| 4,348,313 | 9/1982 | McBee et al. | |
| 4,391,969 | 7/1983 | McBee et al. | 524/609 |
| 4,741,782 | 5/1988 | Styron | 106/97 |

OTHER PUBLICATIONS

Brochure entitled "Modified Sulfur Concrete" author: National Chempruf Concrete, Inc.; six pages.

*Primary Examiner*—Allan M. Lieberman
*Attorney, Agent, or Firm*—Hovey, Williams, Timmons & Collins

[57] ABSTRACT

An improved modified sulfur concrete product is provided in the form of discrete, self-sustaining pellets of modified sulfur concrete which can be shipped and stored for indefinite periods and remelted to yield useable concrete. The pellets are preferably formed by first preparing a quantity of hot modified sulfur concrete (74), followed by passing such concrete (74) into a pelletizing chamber (12) equipped with an elongated auger-type, axially rotatable mixing element (14) and apparatus (16) for the introduction of pressurized air and water into the chamber (12) in the form of a spray. Supplementary pressurized air may advantageously be added at spaced points along the length of the chamber (12).

1 Claim, 1 Drawing Sheet

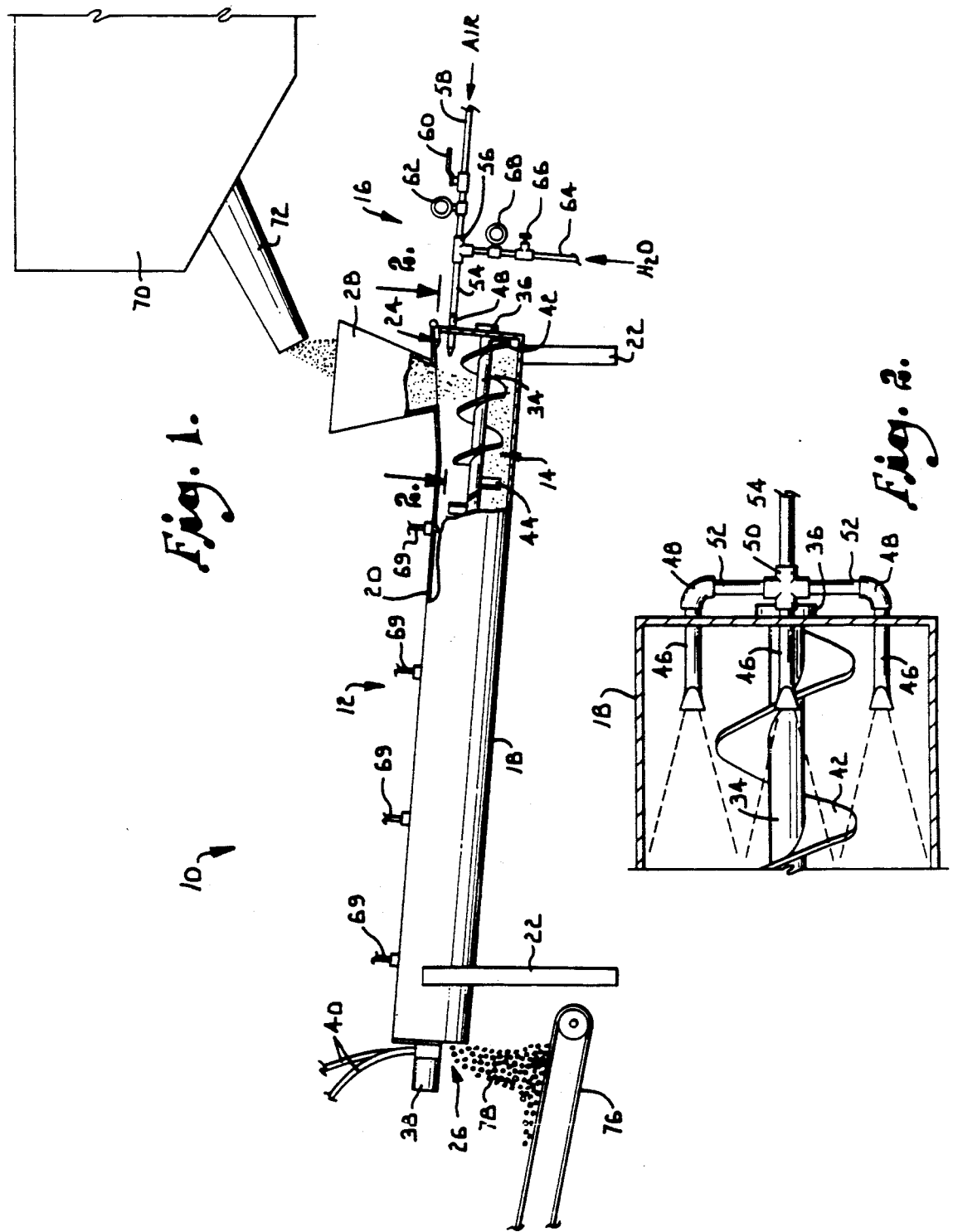

PELLETIZED SULFUR CONCRETE AND METHOD OF PREPARING SAME

BACKGROUND OF THE INVENTION

1. Field of the Invention

The present invention is broadly concerned with a method and apparatus for the preparation of pelletized modified sulfur concrete which can be shipped and stored for indefinite periods and simply remelted at a construction site so as to provide a coherent pourable mass of modified sulfur concrete. More particularly, it is concerned with such a method and apparatus (and the resultant pelletized product) which are characterized by treatment of hot modified sulfur concrete in an elongated auger-type mixing chamber along with injected pressurized air and water to solidify and freeze the concrete in a pelletized, remeltable form.

2. Description of the Prior Art

U.S. Pat. No. 4,348,313 describes an improved modified sulfur concrete preferably comprising aggregate, mineral filler and sulfur cement, the latter being composed of 95% sulfur and 5% plasticizer. The plasticizer in turn comprises a 50%—50% blend of dicyclopentadiene and oligomers of cyclopentadiene. Such improved concrete is formed by initially heating the aggregate (e.g., rock and sand) to approximately 375° F. in a rotary dryer, whereupon the heated aggregate is transferred into a mixing truck heated by catalytic heaters. The modified sulfur cement is then added to the aggregate along with the mineral filler, typically fly ash. Such additions bring the temperature of the total mixture down to about 270° F., and mixing proceeds at or above this temperature until a homogeneous concrete mixture is obtained. The modified sulfur concrete can then be poured in the conventional manner.

Modified sulfur cement produced in accordance with U.S. Pat. No. 4,348,313 has proven to be extremely resistant to most mineral acids and salts and develops high early strength because of its rapid set upon cooling. In addition, the finished concrete product exhibits enhanced freeze-thaw stability and strength characteristics.

Modified sulfur concrete of the type in question is further described in a brochure distributed by National Chempruf Concrete, Inc. of Clarksville, Tenn. entitled "Modified Sulfur Concrete Is The Construction Alternative In Highly Corrosive Environments"; this brochure, together with U.S. Pat. No. 4,348,313, are incorporated by reference herein.

While modified sulfur concrete of the type described has achieved widespread use, problems remain insofar as the handling and formulation thereof are concerned. For example, in many instances it would be desirable to premix the concrete ingredients at ambient temperature, and ship these to a construction site for heating and use. However, attempts along these lines have proved unworkable in that the materials tend to absorb moisture and/or separate out over time, producing nonhomogeneous compositions. As a consequence, it is heretofore been necessary to separately provide the starting materials and mix and heat these on site to provide a finished concrete product.

SUMMARY OF THE INVENTION

The present invention overcomes the problems outlined above, and provides a method of forming pelletized, remeltable modified sulfur concrete which is substantially dust-free and can be shipped and stored indefinitely without separation into a nonhomogeneous state. The method of the invention includes the steps of first forming a quantity of hot modified sulfur concrete by conventional means, followed by passing of such concrete in its heated, flowable condition into a pelletizing chamber while simultaneously introducing quantities of pressurized gas and liquid into the chamber. The concrete, gas and liquid are then intimately mixed to form solidified, frozen pellets of modified sulfur concrete which can be remelted to form a coherent pourable mass. Such pellets typically have an average diameter of from about ⅛ to 1 inch and a bulk density of from about 100 to 155 pounds/cu.ft.

The preferred pelletizing apparatus includes an elongated pelletizing chamber presenting an inlet for receiving hot modified sulfur concrete, and a spaced outlet for discharge of concrete pellets therefrom. Means is also provided for injecting liquid and pressurized gas into the confines of the chamber, along with a mixing element advantageously in the form of an elongated, augertype shaft mixer. The pressurized air and water are preferably premixed and injected into the pelletized chamber as a spray adjacent the inlet end of the chamber; supplementary pressurized air may also injected at spaced points along the length of the chamber.

BRIEF DESCRIPTION OF THE DRAWINGS

FIG. 1 is a side view, partially in section and with parts broken away for clarity, illustrating the preferred pelletizing apparatus of the invention; and FIG. 2 is an enlarged sectional view taken along the line 2—2 of FIG. 1.

DESCRIPTION OF THE PREFERRED EMBODIMENT

Turning now to the drawing, pelletizing apparatus broadly referred to by the numeral 10 is illustrated in FIG. 1. The apparatus 10 includes a pelletizing chamber 12 equipped with an internal mixing element 14 as well as apparatus referred to by the numeral 16 for injection of pressurized air and water into the confines of chamber 12.

In more detail, the chamber 12 is in the form of an elongated, inclined, trough-like body 18 provided with a flexible, removable cover 20. The body 18 is supported by struts 22 and includes an inlet end 24 as well as a spaced outlet 26 defining the remote end of the body. An upstanding, frustoconical inlet hopper 28 is positioned adjacent inlet end 24 by means of a lowermost metallic flange 30 resting atop body 18; the lower end of hopper 28 defines an inlet opening 32 for the chamber.

Mixing element 14 includes an elongated central shaft 34 which extends the entire length of chamber 12 and is supported for axial rotation by means of suitable bearings 36 adjacent each end of the shaft. A hydraulic motor 38 is operatively secured to the end of shaft 34 adjacent outlet 26, with the motor being driven through a remote hydraulic pump (not shown) and appropriate connection lines 40. Shaft 34 is provided with a short, helically flighted auger section 42 beneath hopper 28, as well as a plurality of generally radially outwardly extending paddles 44 spaced along the remaining length of the shaft 34.

The apparatus 16 includes a plurality of spaced flattened pipe spray nozzles 46 situated outside chamber 12 adjacent the inlet end thereof (see FIG. 2). The nozzles 46 are in turn supported by conventional plumbing components including elbows 48, 4-way union 50 and connecting pipes 52. The nozzles 46 are supplied via an incoming supply pipe 54 which extends through the wall of body 18 and is interconnected with union 50. The remote end of supply pipe 54 is connected to one leg of a mixing tee 56. One of the remaining legs of tee 56 is connected with a compressed air line 58 including a valve 60 and gauge 62; the remaining leg of tee 56 is connected to a water line 64 likewise equipped with a valve 66 and gauge 68. As will be readily appreciated from the foregoing description, pressurized air and water introduced through the lines 58, 64 is mixed in tee 56 and is thereupon conveyed through pipe 54 to the nozzles 46, thereby creating an air-water spray from the nozzles. Such spray is illustrated in FIG. 2, with a typical spray pattern being indicated in phantom.

It is also preferred to introduce supplementary pressurized air into chamber 12 at spaced points along the length thereof between hopper 28 and outlet 26. To this end, a plurality of air delivery pipes 69 are positioned at spaced points along cover 20 and extend into the confines of body 18. The pipes 69 are connected to a common manifold (not shown), the latter being coupled to a source of compressed air.

FIG. 1 also illustrates the rear end 70 of a conventional mixing truck used to produce masses of hot modified sulfur concrete. A spout 72 is oriented for delivery of such hot concrete (identified by reference numeral 74) into hopper 28. Finally, FIG. 1 also schematically depicts a conveyor 76 positioned beneath outlet 26 of chamber 12 for receiving the discrete modified sulfur concrete pellets 78 as they emerge from the apparatus 10 and conveying the pellets for cooling and storage or bulk packaging.

In the production of pelletized concrete in accordance with invention, the first step involves the production of hot modified sulfur concrete. This procedure is entirely conventional, and includes initial heating of aggregate to about 375° F., followed by transfer of such hot aggregate to a mixing truck heated by catalytic heaters. Modified sulfur cement of the type described in U.S. Pat. No. 4,348,313 is then added along with mineral filler with continued mixing until homogeneity is achieved. Typically, such a modified sulfur concrete would contain 5-15% mineral filler, and from about 11-20% modified sulfur cement, with the balance being aggregate DEK 9-8-89 of the desired specification. In any event, the finished hot modified sulfur concrete would commonly have a temperature of about 270° F., and more broadly of from about 250-300° F.

Again referring to FIG. 1, it will be seen that the hot modified sulfur concrete 74 is directed into and through hopper 28 for introduction into chamber 12. Simultaneously, an air-water spray is introduced into the chamber via nozzles 46. In practice, air at a pressure of from about 5-25 psi is directed through line 58, while ambient temperature water at a pressure of from about 15-25 psi is directed through line 64. Generally, from about 250 to 500 pounds of water are introduced for each ton of initially hot concrete processed into pellets. The mixing element 14 is also axially rotated at a speed of from about 1100-1400 rpm. Supplementary air is directed through the pipes 69 at a pressure of from about 35-55 psi.

The introduction of pressurized air and water, together with the rotation of mixing element 14, creates an intimate mixing action within chamber 12. At the same time, pronounced cooling of the concrete is effected by the water/air addition. Finally, the action of the mixing element is believed to induce a substantial rotative or "rolling" action on the initially hot modified sulfur concrete so as to create the small, discrete pellets of the invention. Examination of the pellets reveals that they are typically comprised of a central piece of aggregate having solidified modified sulfur concrete material (e.g., sand, modified sulfur cement and filler) agglomerated thereto.

In any event, the action of pelletizing apparatus 10 serves to create the described modified sulfur concrete pellets which typically issue from outlet 26 at a temperature of from about 140-180° F. Such pellets can then be stored or shipped to a construction site without fear of separation thereof into a nonhomogeneous state. At such a site, it is only necessary to remelt the pellets to a temperature of, e.g., 250-275° F., whereupon the remelted concrete is ready for use. Such concrete is either indistinguishable from site-formed modified sulfur concrete, or is even slightly stronger than such material.

We claim:

1. A concrete product comprising discrete, substantially solid pellets of modified sulfur concrete which can be melted to form a coherent pourable mass of such concrete, said pellets having an average diameter of from ⅛ to 1 inch and a bulk density of from about 100 to 155 pounds/cu.ft., said modified sulfur concrete comprising respective quantities of aggregate, mineral filler and sulfur cement, said sulfur cement comprising sulfur reacted with a plasticizer including a blend of dicyclopentadiene and oligomers of cyclopentadiene.

* * * * *